United States Patent
Rong et al.

(10) Patent No.: US 11,813,752 B2
(45) Date of Patent: Nov. 14, 2023

(54) MOBILE MANIPULATION CONTROL METHOD AND SYSTEM OF QUADRUPED ROBOT WITH OPERATION ARM

(71) Applicant: Shandong University, Jinan (CN)

(72) Inventors: Xuewen Rong, Jinan (CN); Aizhen Xie, Jinan (CN); Teng Chen, Jinan (CN); Guoteng Zhang, Jinan (CN); Yibin Li, Jinan (CN); Guanglin Lu, Jinan (CN); Jian Bi, Jinan (CN); Yong Fan, Jinan (CN)

(73) Assignee: Shandong University, Jinan (CN)

( * ) Notice: Subject to any disclaimer, the term of this patent is extended or adjusted under 35 U.S.C. 154(b) by 0 days.

(21) Appl. No.: 18/329,674

(22) Filed: Jun. 6, 2023

(65) Prior Publication Data
US 2023/0311320 A1     Oct. 5, 2023

(30) Foreign Application Priority Data
Jun. 7, 2022 (CN) .......................... 202210636165.2

(51) Int. Cl.
*B25J 9/16* (2006.01)
*B62D 57/032* (2006.01)

(52) U.S. Cl.
CPC ............. *B25J 9/1664* (2013.01); *B25J 9/162* (2013.01); *B62D 57/032* (2013.01)

(58) Field of Classification Search
CPC ........ B25J 9/1664; B25J 9/162; B62D 57/032
See application file for complete search history.

(56) References Cited

U.S. PATENT DOCUMENTS

| 2015/0051734 A1* | 2/2015 | Zheng .................... B25J 9/1633 901/1 |
| 2015/0120044 A1 | 4/2015 | Cory |

FOREIGN PATENT DOCUMENTS

| CN | 111506100 A | 8/2020 |
| CN | 112207825 A | 1/2021 |
| CN | 112693541 A | 4/2021 |
| CN | 113246120 A | 8/2021 |

OTHER PUBLICATIONS

Teng Chen et al.,"Design and Verification of Real-time Plantar Force Optimization for Quadruped Robots in Dynamic Gait", Robot, vol. 41, No. 3, May 2019, pp. 307-316.

* cited by examiner

*Primary Examiner* — Basil T. Jos

(57) ABSTRACT

A mobile manipulation control method of a quadruped robot with an operation arm, including: obtaining current pose information of the legged mobile manipulator; decomposing a task into subtasks, and prioritizing the subtasks; based on the pose information and a dynamic model, generating a motion trajectory under each subtask; based on the dynamic model, optimizing an optimal plantar force of a supporting leg and an end-of-arm force under each subtask; based on a multi-task spatial projection method, calculating desired control quantity of all joints under different subtasks; and (d) optimizing the optimal plantar force and the desired control quantity with the whole-body dynamic model as a constraint to obtain control torques; and based on the control torques, controlling the legged mobile manipulator's motion. A control system is further provided.

9 Claims, 2 Drawing Sheets

MOBILE MANIPULATION CONTROL METHOD AND SYSTEM OF QUADRUPED ROBOT WITH OPERATION ARM

CROSS-REFERENCE TO RELATED APPLICATIONS

This application claims the benefit of priority from Chinese Patent Application No. 202210636165.2, filed on Jun. 7, 2022. The content of the aforementioned application, including any intervening amendments thereto, is incorporated herein by reference in its entirety.

TECHNICAL FIELD

This application relates to robot control, and more particularly to a mobile manipulation control method and system of a quadruped robot with an operation arm.

BACKGROUND

The control system of a legged mobile manipulator is expected to consider all the degrees of freedom in a control framework to realize the whole-body control. The to-be-solved problem of the whole-body control system can be further divided into task decomposition, motion path planning, whole-body dynamic modeling, singularity avoidance for the arm, calculation and mapping of contact force, and trajectory tracking.

The existing legged mobile manipulators (e.g., Hydraulically Actuated Quadruped (HyQ) robots developed by The Italian Institute of Technology (IIT)) generally adopt a separate and independent control strategy, in which the quadruped body is controlled by using the commonly-used classical control framework, and the arm is controlled by a separate controller. In the case of excessive interaction between the quadruped body and arm, the legged mobile manipulator may be prone to instability. Moreover, some quadrupedal robots (e.g., ANYmal robot developed by ETH Zurich) adopt a control framework based on multi-layer optimization, in which the control task is divided into multiple subtasks, and it is required to find an optimal solution for each subtask. If there are excessive tasks, the solving efficiency and control cycle may be limited. the Vision 60® quadruped unmanned ground vehicle (Q-UGV) developed by Ghost Robotics Corporation adopts a virtual constraint-based hybrid control strategy, in which the motion trajectory is generated through event-based model prediction.

SUMMARY

In order to solve the above problems, this application provides a mobile manipulation control method and system for a legged mobile manipulator. The method uses a complex dynamic model containing all degrees of freedom of the legged mobile manipulator together with a simplified centroid dynamic model. The legged mobile manipulator's state is estimated using onboard Inertial Measurement Unit (IMU) and joint sensors. The virtual model of the legged mobile manipulator's center of mass with the force compensation term of the arm is established to find the optimal plantar force of the supporting leg. The whole motion of the legged mobile manipulator is divided into some tasks. The desired joints' acceleration is got using the null-space projection method, and the desired joint torques are got by the optimization procedure. The torque commands are sent to the joint's controller and tracked in a frequency of 40 kHz.

In a first aspect, this application provides a mobile manipulation control method of a legged mobile manipulator, wherein the legged mobile manipulator consists of a quadruped robotic platform and an arm, and the control method includes:

(a) obtaining current pose information of the legged mobile manipulator;

(b) decomposing a task received by the legged mobile manipulator into a plurality of subtasks, and prioritizing the plurality of subtasks; and based on the current pose information and a dynamic model, generating a whole-body motion trajectory of the legged mobile manipulator for each of the plurality of subtasks; wherein the dynamic model combines a whole-body dynamic model based on all degrees of freedom of the legged mobile manipulator and a simplified centroid dynamic model; and an arm compensation term is introduced into the simplified centroid dynamic model;

(c) based on the dynamic model, finding an optimal plantar force of a supporting leg and an optimal end-of-arm force under each of the plurality of subtasks; and based on a multi-task space projection method, calculating a desired control amount of each of joints of the legged mobile manipulator under the plurality of subtasks; and (d) with the whole-body dynamic model as a constraint, optimizing the optimal plantar force and the desired control amount to obtain control torques of the joints of the legged mobile manipulator, wherein the joints of the legged mobile manipulator include an arm joint; and based on the control torques, controlling motion of the legged mobile manipulator;

wherein the simplified centroid dynamic model is expressed as follows:

$$m(\ddot{p}_{com}^d + g) + f_{c,arm} = \sum_{i=1}^{c} f_i + f_{e,arm} I\dot{\omega}_b^d + n_{c,arm} = \sum_{i=1}^{c} r_i^* \times f_i + n_{e,arm}$$

wherein m is the body's gravity of the legged mobile manipulator; $\ddot{p}_{com}^d$ is a linear acceleration at the center of the mass; $\dot{w}_b^d$ is an angular acceleration; $f_i$ is the contact force between the supporting leg and ground; $f_{e,arm}$ is an interaction force between the arm end and the manipulation object; $r_i^*$ is the vector from the contact point to the center of mass; the arm compensation term includes an equivalent force $f_{c,arm}$ and an equivalent torque $n_{c,arm}$; and I is the inertia tensor of the body of the legged mobile manipulator.

In an embodiment, the step of "based on the dynamic model, finding an optimal plantar force of a supporting leg and an optimal end-of-arm force under each of the plurality of subtasks" includes:

based on an angle and mass of the arm joint of the legged mobile manipulator, a joint reference coordinate system, a joint inertial parameter, and a mass of the legged mobile manipulator at a current moment, calculating an actual center-of-gravity position of the legged mobile manipulator in a current state; and according to the actual center-of-gravity position, updating a force arm at a ground contact point of the supporting leg in the current state; and based on the dynamic model, obtaining the optimal plantar force of the supporting leg and the optimal end-of-arm force by constructing a Quadratic Programming problem.

In an embodiment, the step of "based on a multi-task space projection method, calculating a desired control amount of each of joints of the legged mobile manipulator under the plurality of subtasks" includes:
mapping a speed value on the overall motion trajectory under each of the plurality of subtasks into a joint space based on a manipulation space projection method, and mapping a lower-priority subtask into a null space of a higher-priority subtask, thereby obtaining a desired position, velocity, and acceleration of the joints of the legged mobile manipulator.

In an embodiment, an optimization problem constructed in the step of "with the whole-body dynamic model as a constraint, optimizing the optimal plantar force and the desired control amount to obtain control torques of the joints of the legged mobile manipulator" is expressed as follows:

$$\delta^* = \arg\min \delta_f^T W_f \delta_f + \delta_a^T W_a \delta_a;$$

wherein the optimization problem is required to meet the following constraints:

$$S_f(M(q)\ddot{q} + h(q, \dot{q})) =$$

$$S_f J_c^T F_{grf} U F_r \geq 0 \ddot{q} = \ddot{q}^{cmd} + \begin{bmatrix} \delta_a \\ 0_{nj} \end{bmatrix} F_{grf} = F_{grf}^{VMC} + \delta_f;$$

$$F_{grf} = F_{grf}^{VMC} + \delta_f$$

$$F_{grf} = F_{grf}^{VMC} + \delta_f$$

$$F_{grf} = F_{grf}^{VMC} + \delta_f$$

wherein $M(q)$ is the mass matrix; $h(q,\dot{q})$ indicates a Coriolis force, centrifugal force or gravity; $S_f$ is a selection matrix; $J_c^T$ is a Jacobi matrix for the supporting leg; $q$ represents a state variable for all the degrees of freedom; $\ddot{q}$ represents optimized accelerations of the joints of the legged mobile manipulator; $\ddot{q}^{cmd}$ represents desired accelerations of the joints of the legged mobile manipulator; $\delta_a$ represents an acceleration adjustment amount at the center of mass of the body; $\delta_f$ is an adjustment amount for a support force; $F_{grf}$ represents a vector of a six-dimensional generalized plantar support force; and $F_{grf}^{VMC}$ represents a support force calculated by the virtual model with a compensation term.

In an embodiment, the current pose information of the legged mobile manipulator includes pose information of the body, and angle information of joints of the supporting leg, a swinging leg, and an arm of the legged mobile manipulator.

In an embodiment, the step of "decomposing a task received by the legged mobile manipulator into a plurality of subtasks, and prioritizing the plurality of subtasks" includes:
decomposing the task received by the legged mobile manipulator into a first subtask associated with a swinging leg, a second subtask associated with the supporting leg, and a third subtask associated with an arm; and prioritizing the first subtask, the second subtask and the third subtask.

In a second aspect, this application provides a control system for implementing the above-mentioned mobile manipulation control method, including:
a data acquisition unit;
a motion trajectory generation unit;
a solving unit; and
a control torque acquisition unit;

wherein the data acquisition unit is configured to obtain the current pose information of the legged mobile manipulator;
the motion trajectory generation unit is configured to decompose the task received by the legged mobile manipulator into the plurality of subtasks, prioritize the plurality of subtasks, and generate the whole-body motion trajectory of the legged mobile manipulator under each of the plurality of subtasks based on the current pose information and the dynamic model; wherein the dynamic model is configured to combine the whole-body dynamic model based on degrees of freedom of the legged mobile manipulator and the simplified centroid dynamic model; and the arm compensation term is introduced into the simplified centroid dynamic model;
the solving unit is configured to find the optimal plantar force of the supporting leg and the optimal end-of-arm force under each of the plurality of subtasks based on the dynamic model, and calculate the desired control amount of all joints of the legged mobile manipulator under the plurality of subtasks based on the multi-task space projection method; and
the control torque acquisition unit is configured to optimize the optimal plantar force and the desired control amount with the whole-body dynamic model as a constraint to obtain the control torques of the joints of the legged mobile manipulator including the arm joint, and control the motion of the legged mobile manipulator based on the control torques.

In a third aspect, this application provides an electronic device, including:
a memory;
a processor; and
a computer program stored in the memory;
wherein the processor is configured to execute the computer program to implement the above mobile manipulation control method.

In a fourth aspect, this application provides a non-transitory computer-readable storage medium, wherein a computer program is stored on the non-transitory computer-readable storage medium, and the computer program is configured to be executed by a processor to implement the above control method.

Compared to the prior art, this application has the following beneficial effects.

(1) In the control method and system provided herein, a whole-body dynamic model including all degrees of freedom of the legged mobile manipulator, and a simplified centroid dynamic model are established. The legged mobile manipulator's state is estimated using the onboard Inertial Measurement Unit (IMU) and joint sensors. A virtual model of the legged mobile manipulator's center of mass with the compensation term of the arm is used to find the optimal plantar force of the supporting leg. By means of the virtual model, the virtual force received by the center of mass can be equivalent to the resultant force after decomposition of the support force received by the supporting leg from ground. The resultant force is equal to the force calculated by the equivalent spring damping model at the center of mass, so that the optimal support force of the supporting leg from the ground can be found by using the optimization method. Combined with the task definition of the legged mobile manipulator and the motion trajectory generated by the command, the control torque of the joint after null-space projection is obtained, thereby realizing the whole-body control of the legged mobile manipulator.

(2) By means of the control method provided in this application, the legged mobile manipulator has both excellent adaptability to the complex terrain and manipulation ability. Compared with the existing quadruped robots, the legged mobile manipulator under the control of the control method provided in this application can complete operational tasks such as cleaning, grasping, and handling objects. Compared with other wheeled single-arm robots, the legged mobile manipulator can use a quadruped mode to deal with complex terrains such as steps, stairs, slopes, and ravines.

(3) The existing separate and independent control strategy fails to consider the interaction between the quadruped body and the arm, and in the case of a relatively large interaction (for example, the arm is fully unfolded and experiences a large range of motion; or the quadruped body is moving), the robot is prone to instability, falling and failure. Therefore, it is often to maintain the quadruped body in a stationary state when operating the arm, resulting in limited motion range and payload of the arm. By comparison, in the control method provided herein, all degrees of freedom of the robot are subject to integrated control, and the interaction between the quadruped body and the arm is automatically coordinated and compensated. Therefore, based on such control strategy, the arm can operate when the quadruped body is moving, and handle unknown loads within a certain range, and the overall operation will not be affected by the unmodelled load at the arm end. Moreover, the multi-task priority adjustment scheme adopted in the control method can enhance the operation precision of the robot under a moving mode.

The advantages of additional aspects of this disclosure will be partially presented in the description below, and some advantages will become apparent from the following description or be known through the implementation of technical solutions of this disclosure.

BRIEF DESCRIPTION OF THE DRAWINGS

The drawings forming a part of the disclosure are used to promoting the understanding of the disclosure, and the embodiments are merely used to explain the disclosure, and should not be considered as limitations to the disclosure.

DETAILED DESCRIPTION OF EMBODIMENTS

The disclosure will be further described in detail below in conjunction with the accompanying drawings and embodiments.

It should be noted that the following detailed descriptions are exemplary and intended to further describe the disclosure. Unless otherwise expressly specified, all technical and scientific terms used herein have the same meanings as those understood by those skilled in the art to which the disclosure belongs.

It should be noted that the terms used herein are only descriptive, and not intended to limit the disclosure. As used herein, unless otherwise expressly specified, the singular form is also intended to include the plural form. Furthermore, it should be understood that the terms "comprising" and/or "including" used herein indicates the presence of listed features, steps, operations, devices, components, and/or combinations thereof.

As used herein, the term "legged mobile manipulator" refers to a quadruped robot equipped with one arm, where the quadruped robot consists of a body and four legs.

Embodiments in the disclosure and the features therein may be combined with each other in the absence of contradiction.

Embodiment 1

Figure 1:
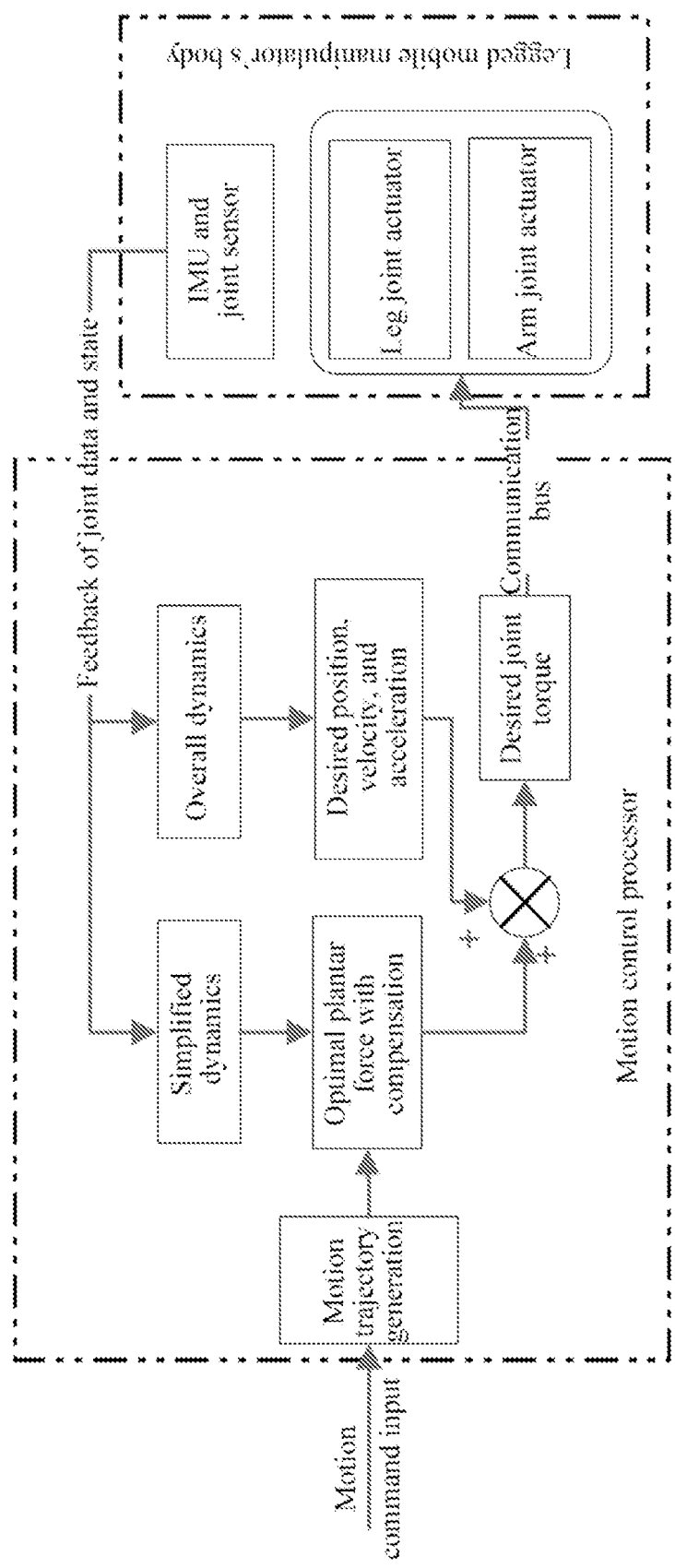
FIG. 1 is a flow chart of a control method of a legged mobile manipulator according to an embodiment of the present disclosure.

This embodiment provides a mobile manipulation control method of a legged mobile manipulator (as shown in FIG. 1), which includes the following steps.

(a) Pose information of the legged mobile manipulator at a current moment is obtained.

(b) A task received by the legged mobile manipulator is decomposed into a plurality of subtasks, and the plurality of subtasks are prioritized. Based on the current pose information and a dynamic model, and a whole-body motion trajectory of the legged mobile manipulator for each of the plurality of subtasks is generated. In this embodiment, the dynamic model combines a whole-body dynamic model based on all degrees of freedom of the legged mobile manipulator and a simplified centroid dynamic model. An arm compensation term is introduced into the simplified centroid dynamic model.

(c) Based on the dynamic model, an optimal plantar force of the supporting leg and the optimal end-of-arm force under each of the plurality of subtasks are found. Based on a multi-task space projection method, a desired control amount of each joint of the legged mobile manipulator under the plurality of subtasks is calculated.

(d) With the whole-body dynamic model as a constraint, the optimal plantar force and the desired control amount are optimized to obtain the control torques of the joints of the legged mobile manipulator (including an arm joint). The control torques (i.e., the desired joint torque in FIG. 1) are sent to joint actuators of the legged mobile manipulator through a high-speed communication bus (e.g., controller area network (CAN) bus, serial peripheral interface (SPI) bus, and network cable), and the joint actuators are controlled according to the control torques to drive the robot to operate, thereby completing the motion control of the legged mobile manipulator. Specifically, the leg joint control torque is sent to a leg joint actuator to drive the corresponding leg to move, and the arm joint control torque is sent to an arm joint actuator to drive the arm to complete the desired operation.

In this embodiment, the motion control method is implemented by a motion control processor. The motion control processor is arranged on the legged mobile manipulator's body, or independently arranged relative to the legged mobile manipulator. The robot body is provided with an inertial measurement unit (IMU) sensor to detect and feed back the robot state. Individual joints of the legged mobile manipulator have their own sensors to detect the position, speed and torque, and the state and joint data of the legged mobile manipulator are transmitted to the motion control processor for processing via the bus.

Figure 2:
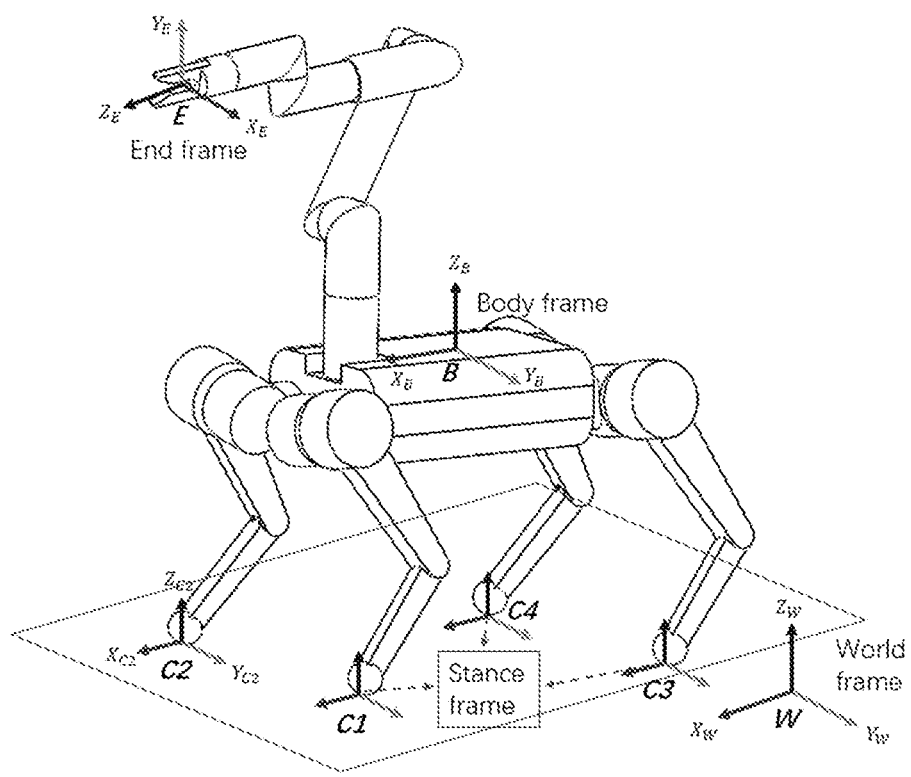
FIG. 2 schematically shows establishment of a coordinate system according to an embodiment of the present disclosure.

Further, for the control method in this embodiment, it is required to establish a coordinate system in advance during the construction of the dynamic model. As shown in FIG. 2, the coordinate system includes a world frame $\{W\}$, a body frame $\{B\}$, an end frame (operating point frame) $\{E\}$, and a stance frame (support point frame) $\{C_i\}$.

More specifically, the world frame {W} is fixed at a specified point on the earth, the Z axis direction is straight up and parallel to the gravity direction, the X axis direction is directly in front of the robot's head, and the Y axis is perpendicular to the plane formed by the X axis and the Z axis and points to the left of the legged mobile manipulator. The body frame {B} is fixed on the body, and the origin of the body frame is located at the center of mass of the body. The Z axis is perpendicular to the body upward, and the X and Y axes of the body frame are parallel to the X and Y axes of the world frame. The end frame {E} is fixed on the gripper on the end of the arm, and the origin of the end frame is located at the geometric center of the gripper. The Z axis is parallel to a rotation axis of the end joint and points outward from the arm, and the X and Y axes of the end frame are parallel to the coordinate axis of the end joint. The stance frame {$C_i$} is fixed on the ground, the origin of the stance frame is at the contact point between the spherical plantar and the ground, the Z axis is opposite to the direction of gravity, and the X axis and the Y axis are parallel to the X axis and Y axis of the world frame. i refers to the i-th supporting leg. It can be understood that the number of the supporting legs is equal to that of the stance frames.

Further, the dynamic model integrating the whole-body dynamic model and the simplified centroid dynamic model is specifically described as follows:

(1) Whole-Body Dynamic Model Including all Degrees of Freedom of the Legged Mobile Manipulator The state variable of the legged mobile manipulator containing all degrees of freedom is defined as $q = [q_{com}^T q_{legs}^T q_{arm}^T]^T \in \Re^{6+12+n}$. The six-dimensional generalized force vector is defined as $F_{grf} = [f_x\ f_y\ f_z\ n_x\ n_y\ n_z]^T \in \Re^6$. The whole-body dynamic formula is expressed as follows:

$$M(q)\ddot{q} + h(q, \dot{q}) = S^T \tau + J_{st}^T F_{grf}$$

In the formula above, M(q) is an inertial matrix; $h(q,\dot{q})$ indicates a Coriolis force, a centrifugal force, or a gravity; S is a selection matrix; τ represents all controllable joints; and $J_{st}^T$ is a Jacobian matrix related to the force.

(2) Simplified Centroid Dynamic Model $m(\ddot{p}_{com}^d + g) + f_{c,arm} = \Sigma_{i=1}^{c} f_i + f_{e,arm} I\dot{\omega}_b^d + n_{c,arm} = \Sigma_{i=1}^{c} r_i^* \times f_i + n_{e,arm}$ The simplified centroid dynamic model is expressed as follows:

In the formulas above, m is body's gravity of the legged mobile manipulator; $\ddot{p}_{com}^d$ is a linear acceleration at a center of mass; $\dot{\omega}_b^d$ is an angular acceleration; $f_i$ is a contact force between the supporting leg and ground; $f_{e,arm}$ is an interaction force between an arm end and a manipulation object; $r_i^*$ is a vector from the contact point between the supporting leg and ground to the center of mass; the arm compensation term includes an equivalent force $f_{c,arm}$ and an equivalent torque $n_{c,arm}$; and I is an inertia tensor of the body of the legged mobile manipulator.

Further, the step of "based on the dynamic model, finding an optimal plantar force of a supporting leg and an optimal end-of-arm force under each of the plurality of subtasks" is performed as follows.

Based on an angle and mass of the arm joint of the legged mobile manipulator, a joint reference coordinate system, a joint inertial parameter, and a mass of the legged mobile manipulator at a current moment, an actual center-of-gravity position of the legged mobile manipulator in a current state is calculated.

According to the actual center-of-gravity position, a force arm at the contact point between the supporting leg and the ground in the current state is updated. Based on the dynamic model, the optimal plantar force of the supporting leg and the optimal end-of-arm force are obtained by constructing a Quadratic Programming problem.

Specifically, based on the angle and mass of the arm joint, the joint reference coordinate system, the joint inertial parameter, and the mass of the legged mobile manipulator at the current moment, the actual center-of-gravity position $r_{CoM}$ of the legged mobile manipulator in the current state is calculated by the following formulas:

$$r_{CoM} = \frac{\sum_{i=1}^{n} m_i \cdot p_i + p_{oe} \cdot m_d}{\sum_{i=0}^{n} m_i + m_d} p_i = R_i \cdot {}^i p_c + p_{oi};$$

and.

$$r_{CoM} = \frac{\sum_{i=1}^{n} m_i \cdot p_i + p_{oe} \cdot m_d}{\sum_{i=0}^{n} m_i + m_d}$$

Specifically, the force arm at the contact point in the current state is updated through $r_{CoM}$. Combined with the virtual force calculated by the virtual model at the center of mass and the centroid dynamic model, Quadratic Programming (QP) problem is constructed to find the optimal force of the supporting leg and the force between the arm end and the environment. The QP problem is expressed as follows:

$$f^d = \arg\min_{f \in \Re} c(Af - b)^T Q(Af - b) + \alpha f^T Wf;\text{ and}$$

$$\text{s.t. } d_{min} < Cf < d_{max}.$$

In the formulas above, $f^d$ is the optimal support force to be solved; A is the force arm matrix, which is calculated according to the position of the supporting leg; b represents the virtual force plus the compensation term; α or W is the weight; $d_{min}$ is the lower limit value of the resultant force; $d_{max}$ is the upper limit value of the resultant force; and C is the inequality matrix.

Further, based on a multi-task space mapping method, a desired control amount of individual joints of the legged mobile manipulator under the plurality of subtasks is calculated. Specifically, a speed value on the whole-body motion trajectory under each subtask is mapped into a joint space based on a manipulation space projection method, and a lower-priority subtask is mapped into a null space of a higher-priority subtask, thereby obtaining a desired position, velocity, and acceleration of the joints of the legged mobile manipulator.

Specifically, for each subtask, based on the manipulation space projection method, the speed value $\dot{x}$ on the desired motion trajectory of the subtask is mapped into the joint space by $\dot{q} = J^\dagger \dot{x} + (I - J^\dagger J)\dot{q}_{null}$. The lower-priority subtask is mapped into the null space of the higher-priority subtask to find the desired position, velocity, and acceleration of the joints of the legged mobile manipulator.

Further, an optimization problem constructed in the step of "with the whole-body dynamic model as a constraint, optimizing the optimal plantar force and the desired control amount to obtain control torques of the joints of the legged mobile manipulator" is expressed as follows:

$$\delta^* = \arg\min \delta_f^T W_f \delta_f + \delta_a^T W_a \delta_a.$$

The optimization problem is required to meet the following constraints:

$$S_f(M(q)\ddot{q} + h(q,\dot{q})) = S_f J_c^T F_{grf}; UF_r \geq 0;$$

$$\ddot{q} = \ddot{q}^{cmd} + \begin{bmatrix} \delta_a \\ 0_{nj} \end{bmatrix}; F_{grf} = F_{grf}^{VMC} + \delta_f \text{ and}$$

$$\ddot{q} = \ddot{q}^{cmd} + \begin{bmatrix} \delta_a \\ 0_{nj} \end{bmatrix}; F_{grf} = F_{grf}^{VMC} + \delta_f$$

$$\ddot{q} = \ddot{q}^{cmd} + \begin{bmatrix} \delta_a \\ 0_{nj} \end{bmatrix}; F_{grf} = F_{grf}^{VMC} + \delta_f$$

$$\ddot{q} = \ddot{q}^{cmd} + \begin{bmatrix} \delta_a \\ 0_{nj} \end{bmatrix}; F_{grf} = F_{grf}^{VMC} + \delta_f$$

In the formulas above, M(q) is a mass matrix; h(q,q̇) indicates a Coriolis force, centrifugal force or gravity; $S_f$ is a selection matrix; $J_c^T$ is a Jacobi matrix for the supporting leg; q represents a state variable for all the degrees of freedom; q̈ represents optimized accelerations of the joints of the legged mobile manipulator; $\ddot{q}^{cmd}$ represents desired accelerations of the joints of the legged mobile manipulator; $\delta_a$ represents an acceleration adjustment amount at the center of mass of the body; $\delta_f$ is an adjustment amount for a support force; $F_{grf}$ represents a vector of a six-dimensional generalized plantar support force; and $F_{grf}^{VMC}$ represents a support force calculated by using a virtual model with a compensation term.

Specifically, the optimal force of the supporting leg and the desired acceleration of the body are optimized with the formula of the whole-body dynamic model as a constraint, and the control torques of the joints of the legged mobile manipulator are obtained. By finding the optimal value $\delta^* = [\delta_a \ \delta_f]^T$ that meets all constraints, the adjustment amount $\delta_a$ and $\delta_f$ are obtained and substituted into the formula of the whole-body dynamic model, thereby finding the feedforward control torque $\tau_{ff} \in \Re^{18+1}$ of the joint. Combining with the joint feedback data, the torque output command of the joints is expressed as:

$$\tau_{cmd,i} = \tau_{ff,i} + k_p \Delta q_i + k_d \Delta \dot{q}_i.$$

In the formula above, $k_p$ is the proportional adjustment factor; $k_d$ is the integral adjustment factor; $\Delta q_i$ represents the position error of the i-th joint; and $\Delta \dot{q}_i$ is the speed error.

In this embodiment, the current pose information of the legged mobile manipulator includes pose information of the body, and angle information of joints of the supporting leg, a swinging leg, and of an arm of the legged mobile manipulator.

In this embodiment, the step of "decomposing a task received by the legged mobile manipulator into a plurality of subtasks, and prioritizing the plurality of subtasks" includes: decomposing the task received by the legged mobile manipulator into a first subtask associated with a swinging leg, a second subtask associated with the supporting leg, and a third subtask associated with an arm; and prioritizing the first subtask, the second subtask and the third subtask.

Specifically, with the mobile cleaning task as an example (the mobile cleaning task is defined to include six subtasks: body's pose, body's position, swinging leg's position, the arm's position, the arm's pose, and the reference angle of the arm joint), the priority levels are assigned to the subtasks from highest to lowest according to the listed order.

The desired motion of the legged mobile manipulator is decomposed into the motion at the center of mass of the body and the end-of-arm motion. The velocity at the center of mass is set to $v_{com}^{des} = [0.3 \ 0.0 \ 0.0]^T$, the desired position of the center of mass is $p_{com}^{des} = v_{com}^{des} \cdot \Delta t$, and the desired pose of the center of mass is $\varphi_{com}^{des} = [0.0 \ 0.0 \ 0.0]$.

According to the desired velocity at the center of mass and the feedback data of the swinging leg, the desired foothold of the swinging leg is expressed as follows:

$$p_{fsw} = k\sqrt{\frac{h}{g}}\left(v_{com}^{act} - v_{com}^{des}\right) + \frac{1}{2} v_{com}^{des} \Delta t_{st}.$$

The cubic interpolation is performed between the foothold and the current position point to obtain the motion trajectory of the swinging leg.

The velocity of the arm end is $v_{el}^{des} = [0.3 \ 0.0 \ 0.0]^T$, the desired position is $p_{end_k}^{des} = p_{end_{k-1}}^{des} + v_{el}^{des} \cdot \Delta t$, and the desired pose angle is $\varphi_{end}^{des} = [0.2 \ 0.22 \ 1.0]$. The reference angle of the arm is defined as $q_{arm}^{des} = [0.2 \ 0.22 \ 0 \ 0 \ 0 \ 0]$.

In this embodiment, the priority is defined according to the rules in Table 1.

TABLE 1

Task definition and priority setting

| Priority | Task |
|---|---|
| 1 | Body's pose |
| 2 | Body's position |
| 3 | Position of swinging leg |
| 4 | End-of-arm position |
| 5 | End-of-arm pose |
| 6 | Reference angle of arm |

Embodiment 2

This embodiment provides a control system of a legged mobile manipulator, including a data acquisition unit, a motion trajectory generation unit, a solving unit, and a control torque acquisition unit.

In this embodiment, the data acquisition unit is used to obtain the current pose information of the legged mobile manipulator.

In this embodiment, the motion trajectory generation unit is configured to decompose the task received by the legged mobile manipulator into a plurality of subtasks, prioritize the plurality of subtasks, and generate a whole-body motion trajectory of the legged mobile manipulator under each subtask based on the current pose information and a dynamic model. The dynamic model is configured to combine a whole-body dynamic model based on degrees of freedom of the legged mobile manipulator and a simplified centroid dynamic model; and the arm compensation term is introduced into the centroid dynamic model.

In this embodiment, the solving unit is configured to find the optimal plantar force of the supporting leg and the optimal end-of-arm force under each subtask based on the dynamic model, and calculate the desired control amount of all joints of the legged mobile manipulator under the subtasks based on the multi-task space projection method.

In this embodiment, the control torque acquisition unit is configured to optimize the optimal plantar force and the desired control amount with the whole-body dynamic model as a constraint to obtain the control torques of joints of the legged mobile manipulator including the arm joint, and control the motion of the legged mobile manipulator based on the control torques.

Further, the control system in the Embodiment 2 corresponds to the control method in Embodiment 1, and other technical details of Embodiment 2 are the same as those in Embodiment 1, and thus will not be repeated herein.

Further, an electronic device is provided, including a memory, a processor, and a computer instruction stored in the memory and runnable on the processor. The computer instruction is executed by the processor to implement the method described in Embodiment 1. For the sake of brevity, the technical details will not be repeated herein.

It should be understood that, in this embodiment, the processor may be a central processing unit (CPU). The processor may also be other general-purpose processors, digital signal processor (DSPs), Application-specific Integrated Circuit (ASICs), Field Programmable Gate Array (FPGA) or other programmable logic devices, discrete gates or transistor logic devices, discrete hardware components, etc. A general-purpose processor can be a microprocessor, or the processor can be any conventional processor.

The memory may include read-only memory (ROM) and random-access memory (RAM), and provide instructions and data to the processor. The memory may also include non-volatile random-access memory (NVRAM). For example, the memory can also store information about device types.

A computer-readable storage medium provided herein is used for storing a computer instruction, which is executed by the processor to implement the method in Embodiment 1.

The method in Embodiment 1 can be directly executed by the hardware processor or completed by the combination of the hardware and the software module in the processor. The software module may be located in random access memory, flash memory, read-only memory, programmable read-only memory or electrically erasable programmable memory, registers and other mature storage media in the art. The storage medium is located in the memory, the processor reads the information in the memory, and combined with the hardware, the steps of the above method are completed.

Those skilled in the art may understand that the units and the algorithm steps in the embodiments may be implemented by electronic hardware or a combination of computer software and electronic hardware. Whether these functions are performed in hardware or software depends on the specific application and constraints of the technical solution. For each particular application, a technical professional may use different methods to implement the described functionality, but such implementation should not be considered beyond the scope of the disclosure.

The control method and system of the legged mobile manipulator provided in the above embodiments can be implemented, and have promising application prospects.

Described above are merely preferred embodiments of the disclosure, which are not intended to limit the disclosure. It should be understood that any modifications and replacements made by those skilled in the art without departing from the spirit of the disclosure should fall within the scope of the disclosure defined by the present claims.

What is claimed is:

1. A mobile manipulation control method of a legged mobile manipulator, comprising:
   (a) obtaining current pose information of the legged mobile manipulator;
   (b) decomposing a task received by the legged mobile manipulator into a plurality of subtasks, and prioritizing the plurality of subtasks; and based on the current pose information and a dynamic model, generating a whole-body motion trajectory of the legged mobile manipulator for each of the plurality of subtasks; wherein the dynamic model combines a whole-body dynamic model based on all degrees of freedom of the legged mobile manipulator and a simplified centroid dynamic model; and an arm compensation term is introduced into the simplified centroid dynamic model;
   (c) based on the dynamic model, finding an optimal plantar force of a supporting leg and an optimal end-of-arm force under each of the plurality of subtasks; and based on a multi-task space projection method, calculating a desired control amount of each of joints of the legged mobile manipulator under the plurality of subtasks; and
   (d) with the whole-body dynamic model as a constraint, optimizing the optimal plantar force and the desired control amount to obtain control torques of the joints of the legged mobile manipulator, wherein the joints of the legged mobile manipulator comprise an arm joint; and based on the control torques, controlling motion of the legged mobile manipulator;
   wherein the simplified centroid dynamic model is expressed as follows:

$$m(\ddot{p}_{com}^d + g) + f_{c,arm} = \sum_{i=1}^{c} f_i + f_{e,arm} I \dot{\omega}_b^d + n_{c,arm} = \sum_{i=1}^{c} r_i^* \times f_i + n_{e,arm}$$

wherein m is body's gravity of the legged mobile manipulator; $\ddot{p}_{com}^d$ is a linear acceleration at a center of mass of a body of the legged mobile manipulator; $\dot{w}_b^d$ is an angular acceleration; $f_i$ is a contact force between the supporting leg and ground; $f_{e,arm}$ is an interaction force between an arm end and a manipulation object; $r_i^*$ is a vector from a contact point between the supporting leg and the ground to the center of mass of the body; the arm compensation term comprises an equivalent force $f_{c,arm}$ and an equivalent torque $n_{c,arm}$; and I is an inertia tensor of the body of the legged mobile manipulator.

2. The mobile manipulation control method of claim 1, wherein the step of "based on the dynamic model, finding an optimal plantar force of a supporting leg and an optimal end-of-arm force under each of the plurality of subtasks" comprises:
   based on an angle and mass of the arm joint, a joint reference coordinate system, a joint inertial parameter, and a mass of the legged mobile manipulator at a current moment, calculating an actual center-of-gravity position of the legged mobile manipulator in a current state; and
   according to the actual center-of-gravity position, updating a force arm at the contact point between the supporting leg and ground in the current state; and based on the dynamic model, obtaining the optimal plantar force of the supporting leg and the optimal end-of-arm force by constructing a Quadratic Programming problem.

3. The mobile manipulation control method of claim 1, wherein the step of "based on a multi-task space projection method, calculating a desired control amount of each of joints of the legged mobile manipulator under the plurality of subtasks" comprises:
   mapping a speed value on the whole-body motion trajectory under each of the plurality of subtasks into a joint space based on a manipulation space projection method, and mapping a lower-priority subtask into a null space of a higher-priority subtask, thereby obtaining a desired position, velocity, and acceleration of the joints of the legged mobile manipulator.

4. The mobile manipulation control method of claim 1, wherein an optimization problem constructed in the step of "with the whole-body dynamic model as a constraint, optimizing the optimal plantar force and the desired control amount to obtain control torques of the joints of the legged mobile manipulator" is expressed as follows:

$$\delta^* = \arg\min \delta_f^T W_f \delta_f + \delta_a^T W_a \delta_a;$$

wherein the optimization problem is required to meet the following constraints:

$$S_f(M(q)\ddot{q} + h(q, \dot{q})) =$$

$$S_f J_c^T F_{grf} U F_r \geq 0 \ddot{q} = \ddot{q}^{cmd} + \begin{bmatrix} \delta_a \\ 0_{nj} \end{bmatrix} F_{grf} = F_{grf}^{VMC} + \delta_f;$$

$$F_{grf} = F_{grf}^{VMC} + \delta_f$$

$$F_{grf} = F_{grf}^{VMC} + \delta_f$$

$$F_{grf} = F_{grf}^{VMC} + \delta_f$$

wherein $M(q)$ is a mass matrix; $h(q,\dot{q})$ indicates a Coriolis force, centrifugal force or gravity; $S_f$ is a selection matrix; $J_c^T$ is a Jacobi matrix for the supporting leg; $q$ represents a state variable for all the degrees of freedom; $\ddot{q}$ represents optimized accelerations of the joints of the legged mobile manipulator; $\ddot{q}^{cmd}$ represents desired accelerations of the joints of the legged mobile manipulator; $\delta_a$ represents an acceleration adjustment amount at the center of mass of the body; $\delta_f$ is an adjustment amount for a support force; $F_{grf}$ represents a vector of a six-dimensional generalized plantar support force; and $F_{grf}^{VMC}$ represents a support force calculated by using a virtual model with a compensation term.

5. The mobile manipulation control method of claim 1, wherein the current pose information of the legged mobile manipulator comprises pose information of the body, and angle information of joints of the supporting leg, a swinging leg, and an arm of the legged mobile manipulator.

6. The mobile manipulation control method of claim 1, wherein the step of "decomposing a task received by the legged mobile manipulator into a plurality of subtasks, and prioritizing the plurality of subtasks" comprises:
decomposing the task received by the legged mobile manipulator into a first subtask associated with a swinging leg, a second subtask associated with the supporting leg, and a third subtask associated with an arm; and prioritizing the first subtask, the second subtask and the third subtask.

7. A control system for implementing the mobile manipulation control method of claim 1, comprising:
a data acquisition unit;
a motion trajectory generation unit;
a solving unit; and
a control torque acquisition unit
wherein the data acquisition unit is configured to obtain the current pose information of the legged mobile manipulator;
the motion trajectory generation unit is configured to decompose the task received by the legged mobile manipulator into the plurality of subtasks, prioritize the plurality of subtasks, and generate the whole-body motion trajectory of the legged mobile manipulator under each of the plurality of subtasks based on the current pose information and the dynamic model; wherein the dynamic model is configured to combine the whole-body dynamic model based on degrees of freedom of the legged mobile manipulator and the simplified centroid dynamic model; and the arm compensation term is introduced into the simplified centroid dynamic model;
the solving unit is configured to find the optimal plantar force of the supporting leg and the optimal end-of-arm force under each of the plurality of subtasks based on the dynamic model, and calculate the desired control amount of all joints of the legged mobile manipulator under the plurality of subtasks based on the multi-task space projection method; and
the control torque acquisition unit is configured to optimize the optimal plantar force and the desired control amount with the whole-body dynamic model as a constraint to obtain the control torques of the joints of the legged mobile manipulator comprising the arm joint, and control the motion of the legged mobile manipulator based on the control torques.

8. An electronic device, comprising:
a memory;
a processor; and
a computer program stored in the memory;
wherein the processor is configured to execute the computer program to implement the mobile manipulation control method of claim 1.

9. A non-transitory computer-readable storage medium, wherein a computer program is stored on the non-transitory computer-readable storage medium, and the computer program is configured to be executed by a processor to implement the mobile manipulation control method of claim 1.

* * * * *